(12) United States Patent
Shpunt

(10) Patent No.: US 9,066,087 B2
(45) Date of Patent: Jun. 23, 2015

(54) DEPTH MAPPING USING TIME-CODED ILLUMINATION

(75) Inventor: Alexander Shpunt, Tel Aviv (IL)

(73) Assignee: APPLE INC., Cupertino, CA (US)

( * ) Notice: Subject to any disclaimer, the term of this patent is extended or adjusted under 35 U.S.C. 154(b) by 203 days.

(21) Appl. No.: 13/885,688

(22) PCT Filed: Nov. 17, 2011

(86) PCT No.: PCT/IB2011/055155
§ 371 (c)(1),
(2), (4) Date: May 16, 2013

(87) PCT Pub. No.: WO2012/066501
PCT Pub. Date: May 24, 2012

(65) Prior Publication Data
US 2014/0022348 A1    Jan. 23, 2014

Related U.S. Application Data

(60) Provisional application No. 61/415,352, filed on Nov. 19, 2010.

(51) Int. Cl.
*H04N 13/02* (2006.01)
*H04N 5/232* (2006.01)
*G01B 11/25* (2006.01)

(52) U.S. Cl.
CPC ............ *H04N 13/0271* (2013.01); *G01B 11/25* (2013.01); *H04N 5/23238* (2013.01)

(58) Field of Classification Search
None
See application file for complete search history.

(56) References Cited

U.S. PATENT DOCUMENTS

| 3,796,498 | A | 3/1974 | Post |
| 4,336,978 | A | 6/1982 | Suzuki |
| 4,542,376 | A | 9/1985 | Bass et al. |
| 4,802,759 | A | 2/1989 | Matsumoto |
| 4,843,568 | A | 6/1989 | Krueger et al. |
| 4,850,673 | A | 7/1989 | Velzel et al. |
| 5,075,562 | A | 12/1991 | Greivenkamp et al. |
| 5,406,543 | A | 4/1995 | Kobayashi et al. |
| 5,477,383 | A | 12/1995 | Jain |

(Continued)

FOREIGN PATENT DOCUMENTS

| CN | 1725042 A | 1/2006 |
| DE | 19736169 A1 | 8/1997 |

(Continued)

OTHER PUBLICATIONS

McDonald et al., "A new Approach to Active Illumination," BMVC 91: Proceedings of the British Machine Vision Conference, Conference Organized for the British Machine Vision Association by the Turning Institute, Sep. 23-26, 1991, University of Glasgow.*

Salvi et al., "Pattern codification strategies in structured light systems," Journal of the Pattern Recognition Society, 2003.*

Ishii et al., "High-Speed 3D Image Acquisition Using Coded Structured Light Projection," Proceeding of the 2007 IEEE/RSJ International Conference on Intelligent Robots and Systems, Oct. 29-Nov. 2, 2007.*

(Continued)

*Primary Examiner* — Dennis Hogue
(74) *Attorney, Agent, or Firm* — D. Kligler I.P. Services Ltd.

(57) ABSTRACT

A method for depth mapping includes illuminating an object with a time-coded pattern and capturing images of the time-coded pattern on the object using a matrix of detector elements. The time-coded pattern in the captured images is decoded using processing circuitry embedded in each of the detector elements so as to generate respective digital shift values, which are converted into depth coordinates.

28 Claims, 6 Drawing Sheets

(56) References Cited

U.S. PATENT DOCUMENTS

| | | |
|---|---|---|
| 5,483,261 A | 1/1996 | Yasutake |
| 5,606,181 A | 2/1997 | Sakuma et al. |
| 5,630,043 A | 5/1997 | Uhlin |
| 5,636,025 A | 6/1997 | Bieman et al. |
| 5,648,951 A | 7/1997 | Kato et al. |
| 5,691,989 A | 11/1997 | Rakuljic et al. |
| 5,712,682 A | 1/1998 | Hannah |
| 5,742,262 A | 4/1998 | Tabata et al. |
| 5,781,332 A | 7/1998 | Ogata |
| 5,835,218 A | 11/1998 | Harding |
| 5,838,428 A | 11/1998 | Pipitone et al. |
| 5,856,871 A | 1/1999 | Cabib et al. |
| 5,909,312 A | 6/1999 | Mendlovic et al. |
| 6,002,520 A | 12/1999 | Hoch et al. |
| 6,031,611 A | 2/2000 | Rosakis et al. |
| 6,041,140 A | 3/2000 | Binns et al. |
| 6,075,605 A * | 6/2000 | Futamura et al. .......... 356/608 |
| 6,081,269 A | 6/2000 | Quarendon |
| 6,084,712 A | 7/2000 | Harding |
| 6,088,105 A | 7/2000 | Link |
| 6,099,134 A | 8/2000 | Taniguchi et al. |
| 6,100,517 A | 8/2000 | Yahav et al. |
| 6,101,269 A | 8/2000 | Hunter et al. |
| 6,108,036 A | 8/2000 | Harada et al. |
| 6,167,151 A | 12/2000 | Albeck |
| 6,259,561 B1 | 7/2001 | George et al. |
| 6,262,740 B1 | 7/2001 | Lauer et al. |
| 6,268,923 B1 | 7/2001 | Michniewicz et al. |
| 6,301,059 B1 | 10/2001 | Huang et al. |
| 6,377,700 B1 | 4/2002 | Mack et al. |
| 6,438,263 B2 | 8/2002 | Albeck et al. |
| 6,494,837 B2 | 12/2002 | Kim et al. |
| 6,495,848 B1 | 12/2002 | Rubbert |
| 6,560,019 B2 | 5/2003 | Nakai |
| 6,583,873 B1 | 6/2003 | Goncharov et al. |
| 6,611,000 B2 | 8/2003 | Tamura et al. |
| 6,686,921 B1 | 2/2004 | Rushmeier et al. |
| 6,700,669 B1 | 3/2004 | Geng |
| 6,707,027 B2 | 3/2004 | Liess et al. |
| 6,731,391 B1 | 5/2004 | Kao et al. |
| 6,741,251 B2 | 5/2004 | Malzbender |
| 6,750,906 B1 | 6/2004 | Itani et al. |
| 6,751,344 B1 | 6/2004 | Grumbine |
| 6,754,370 B1 | 6/2004 | Hall-Holt et al. |
| 6,759,646 B1 | 7/2004 | Acharya et al. |
| 6,803,777 B2 | 10/2004 | Pfaff et al. |
| 6,810,135 B1 | 10/2004 | Berenz et al. |
| 6,813,440 B1 | 11/2004 | Yu et al. |
| 6,825,985 B2 | 11/2004 | Brown et al. |
| 6,841,780 B2 | 1/2005 | Cofer et al. |
| 6,859,326 B2 | 2/2005 | Sales |
| 6,927,852 B2 | 8/2005 | Reel |
| 6,937,348 B2 | 8/2005 | Geng |
| 6,940,583 B2 | 9/2005 | Butt et al. |
| 7,006,952 B1 | 2/2006 | Matsumoto et al. |
| 7,009,742 B2 | 3/2006 | Brotherton-Ratcliffe et al. |
| 7,013,040 B2 | 3/2006 | Shiratani |
| 7,076,024 B2 | 7/2006 | Yokhin |
| 7,112,774 B2 | 9/2006 | Baer |
| 7,120,228 B2 | 10/2006 | Yokhin et al. |
| 7,127,101 B2 | 10/2006 | Littlefield et al. |
| 7,194,105 B2 | 3/2007 | Hersch et al. |
| 7,227,618 B1 | 6/2007 | Bi |
| 7,231,069 B2 | 6/2007 | Nahata |
| 7,256,899 B1 | 8/2007 | Faul et al. |
| 7,304,735 B2 | 12/2007 | Wang et al. |
| 7,335,898 B2 | 2/2008 | Donders et al. |
| 7,369,685 B2 | 5/2008 | DeLean |
| 7,385,708 B2 | 6/2008 | Ackerman et al. |
| 7,433,024 B2 | 10/2008 | Garcia et al. |
| 7,551,719 B2 | 6/2009 | Yokhin et al. |
| 7,560,679 B1 | 7/2009 | Gutierrez |
| 7,659,995 B2 | 2/2010 | Knighton et al. |
| 7,700,904 B2 | 4/2010 | Toyoda et al. |
| 7,751,063 B2 | 7/2010 | Dillon et al. |
| 7,811,825 B2 | 10/2010 | Fauver et al. |
| 7,840,031 B2 | 11/2010 | Albertson et al. |
| 7,952,781 B2 | 5/2011 | Weiss et al. |
| 8,018,579 B1 | 9/2011 | Krah |
| 8,035,806 B2 | 10/2011 | Jin et al. |
| 8,126,261 B2 | 2/2012 | Medioni et al. |
| 8,326,025 B2 | 12/2012 | Boughorbel |
| 8,384,997 B2 | 2/2013 | Shpunt et al. |
| 2001/0016063 A1 | 8/2001 | Albeck et al. |
| 2002/0041327 A1 | 4/2002 | Hildreth et al. |
| 2002/0075456 A1 | 6/2002 | Shiratani |
| 2003/0015647 A1 | 1/2003 | Guo et al. |
| 2003/0048237 A1 | 3/2003 | Sato et al. |
| 2003/0057972 A1 | 3/2003 | Pfaff et al. |
| 2003/0156756 A1 | 8/2003 | Gokturk et al. |
| 2004/0001145 A1 | 1/2004 | Abbate |
| 2004/0012958 A1 | 1/2004 | Hashimoto et al. |
| 2004/0063235 A1 | 4/2004 | Chang |
| 2004/0082112 A1 | 4/2004 | Stephens |
| 2004/0105580 A1 | 6/2004 | Hager et al. |
| 2004/0130730 A1 | 7/2004 | Cantin et al. |
| 2004/0130790 A1 | 7/2004 | Sales |
| 2004/0174770 A1 | 9/2004 | Rees |
| 2004/0213463 A1 | 10/2004 | Morrison |
| 2004/0218262 A1 | 11/2004 | Chuang et al. |
| 2004/0223075 A1* | 11/2004 | Furlan et al. .................. 348/363 |
| 2004/0228519 A1 | 11/2004 | Littlefield et al. |
| 2004/0264764 A1 | 12/2004 | Kochi et al. |
| 2005/0018209 A1 | 1/2005 | Lemelin et al. |
| 2005/0052637 A1 | 3/2005 | Shaw et al. |
| 2005/0111705 A1 | 5/2005 | Waupotitsch et al. |
| 2005/0134582 A1 | 6/2005 | Claus et al. |
| 2005/0135555 A1 | 6/2005 | Claus et al. |
| 2005/0178950 A1 | 8/2005 | Yoshida |
| 2005/0200838 A1 | 9/2005 | Shaw et al. |
| 2005/0200925 A1 | 9/2005 | Brotherton-Ratcliffe et al. |
| 2005/0231465 A1 | 10/2005 | DePue et al. |
| 2005/0271279 A1 | 12/2005 | Fujimura et al. |
| 2006/0001055 A1 | 1/2006 | Ueno et al. |
| 2006/0017656 A1 | 1/2006 | Miyahara |
| 2006/0072851 A1 | 4/2006 | Kang et al. |
| 2006/0156756 A1 | 7/2006 | Becke |
| 2006/0221218 A1 | 10/2006 | Adler et al. |
| 2006/0221250 A1 | 10/2006 | Rossbach et al. |
| 2006/0252167 A1 | 11/2006 | Wang |
| 2006/0252169 A1 | 11/2006 | Ashida |
| 2006/0269896 A1 | 11/2006 | Liu et al. |
| 2007/0019909 A1 | 1/2007 | Yamauchi et al. |
| 2007/0046924 A1* | 3/2007 | Chang ........................ 356/3.01 |
| 2007/0057946 A1 | 3/2007 | Albeck et al. |
| 2007/0060336 A1 | 3/2007 | Marks et al. |
| 2007/0133840 A1 | 6/2007 | Cilia |
| 2007/0165243 A1 | 7/2007 | Kang et al. |
| 2007/0182949 A1* | 8/2007 | Niclass ........................... 356/3 |
| 2007/0262985 A1 | 11/2007 | Watanble et al. |
| 2008/0018595 A1 | 1/2008 | Hildreth et al. |
| 2008/0031513 A1 | 2/2008 | Hart |
| 2008/0037829 A1 | 2/2008 | Givon |
| 2008/0106746 A1 | 5/2008 | Shpunt et al. |
| 2008/0118143 A1 | 5/2008 | Gordon et al. |
| 2008/0198355 A1 | 8/2008 | Domenicali et al. |
| 2008/0212835 A1 | 9/2008 | Tavor |
| 2008/0240502 A1 | 10/2008 | Freedman et al. |
| 2008/0247670 A1 | 10/2008 | Tam et al. |
| 2008/0278572 A1 | 11/2008 | Gharib et al. |
| 2008/0285827 A1 | 11/2008 | Meyer et al. |
| 2009/0016642 A1 | 1/2009 | Hart |
| 2009/0046152 A1 | 2/2009 | Aman |
| 2009/0060307 A1 | 3/2009 | Ghanem et al. |
| 2009/0090937 A1 | 4/2009 | Park |
| 2009/0096783 A1 | 4/2009 | Shpunt et al. |
| 2009/0183125 A1 | 7/2009 | Magal et al. |
| 2009/0183152 A1 | 7/2009 | Yang et al. |
| 2009/0185274 A1 | 7/2009 | Shpunt |
| 2009/0226079 A1 | 9/2009 | Katz et al. |
| 2009/0244309 A1 | 10/2009 | Maison et al. |
| 2009/0295951 A1* | 12/2009 | Fowler et al. .................. 348/262 |
| 2010/0007717 A1 | 1/2010 | Spektor et al. |
| 2010/0013860 A1 | 1/2010 | Mandella et al. |

(56) References Cited

U.S. PATENT DOCUMENTS

| | | |
|---|---|---|
| 2010/0020078 A1 | 1/2010 | Shpunt |
| 2010/0118123 A1 | 5/2010 | Freedman et al. |
| 2010/0128221 A1 | 5/2010 | Muller et al. |
| 2010/0142014 A1 | 6/2010 | Rosen et al. |
| 2010/0177164 A1 | 7/2010 | Zalevsky et al. |
| 2010/0182406 A1 | 7/2010 | Benitez |
| 2010/0194745 A1 | 8/2010 | Leister et al. |
| 2010/0201811 A1 | 8/2010 | Garcia et al. |
| 2010/0225746 A1 | 9/2010 | Shpunt et al. |
| 2010/0243899 A1 | 9/2010 | Ovsiannikov et al. |
| 2010/0245826 A1 | 9/2010 | Lee |
| 2010/0265316 A1 | 10/2010 | Sali et al. |
| 2010/0278384 A1 | 11/2010 | Shotton et al. |
| 2010/0284082 A1 | 11/2010 | Shpunt et al. |
| 2010/0290698 A1 | 11/2010 | Shpunt et al. |
| 2010/0303289 A1 | 12/2010 | Polzin et al. |
| 2010/0321773 A1* | 12/2010 | Chen et al. .................. 359/386 |
| 2011/0001799 A1 | 1/2011 | Rothenberger et al. |
| 2011/0019258 A1 | 1/2011 | Levola |
| 2011/0025827 A1 | 2/2011 | Shpunt et al. |
| 2011/0043403 A1 | 2/2011 | Loffler |
| 2011/0050859 A1* | 3/2011 | Kimmel et al. ................ 348/50 |
| 2011/0069389 A1 | 3/2011 | Shpunt |
| 2011/0074932 A1 | 3/2011 | Gharib et al. |
| 2011/0075259 A1 | 3/2011 | Shpunt |
| 2011/0096182 A1 | 4/2011 | Cohen et al. |
| 2011/0114857 A1 | 5/2011 | Akerman et al. |
| 2011/0134114 A1 | 6/2011 | Rais et al. |
| 2011/0158508 A1 | 6/2011 | Shpunt et al. |
| 2011/0164132 A1* | 7/2011 | Buettgen et al. .............. 348/135 |
| 2011/0187878 A1 | 8/2011 | Mor et al. |
| 2011/0188054 A1 | 8/2011 | Mor et al. |
| 2011/0211044 A1 | 9/2011 | Shpunt et al. |
| 2011/0279648 A1 | 11/2011 | Lutian et al. |
| 2011/0285910 A1 | 11/2011 | Bamji et al. |
| 2011/0295331 A1 | 12/2011 | Wells et al. |
| 2011/0310125 A1 | 12/2011 | Mceldowney et al. |
| 2012/0012899 A1 | 1/2012 | Jin et al. |
| 2012/0038986 A1 | 2/2012 | Pesach |
| 2012/0051588 A1 | 3/2012 | Mceldowney |
| 2012/0140094 A1 | 6/2012 | Shpunt et al. |
| 2012/0140109 A1 | 6/2012 | Shpunt et al. |
| 2012/0249744 A1 | 10/2012 | Pesach et al. |
| 2012/0269404 A1* | 10/2012 | Hassebrook et al. ......... 382/115 |
| 2012/0281240 A1 | 11/2012 | Cohen et al. |
| 2013/0038881 A1 | 2/2013 | Pesach et al. |
| 2013/0038941 A1 | 2/2013 | Pesach et al. |
| 2013/0127854 A1 | 5/2013 | Shpunt et al. |
| 2013/0206967 A1 | 8/2013 | Shpunt et al. |
| 2013/0207970 A1 | 8/2013 | Shpunt et al. |

FOREIGN PATENT DOCUMENTS

| | | |
|---|---|---|
| DE | 19638727 A1 | 3/1998 |
| GB | 2352901 A | 2/2001 |
| JP | 62206684 A | 9/1987 |
| JP | 01-240863 | 9/1989 |
| JP | 03-029806 U | 2/1991 |
| JP | H03-040591 A | 2/1991 |
| JP | 06-273432 | 9/1994 |
| JP | H08-186845 A | 7/1996 |
| JP | H10-327433 A | 12/1998 |
| JP | 2000131040 A | 5/2000 |
| JP | 2001141430 A | 5/2001 |
| JP | 2002122417 A | 4/2002 |
| JP | 2002-152776 A | 5/2002 |
| JP | 2002-213931 A | 7/2002 |
| JP | 2002-365023 A | 12/2002 |
| JP | 2006-128818 A | 5/2006 |
| JP | 2011118178 A | 6/2011 |
| WO | 9303579 A1 | 2/1993 |
| WO | 9827514 A2 | 6/1998 |
| WO | 9828593 A1 | 7/1998 |
| WO | 9828593 A2 | 7/1998 |
| WO | 2005010825 A2 | 2/2005 |
| WO | 2007/043036 A1 | 4/2007 |
| WO | 2007/105205 A2 | 9/2007 |
| WO | 2008/120217 A2 | 10/2008 |
| WO | 2010/004542 A1 | 1/2010 |
| WO | 2012020380 A1 | 2/2012 |
| WO | 2012066501 A1 | 5/2012 |

OTHER PUBLICATIONS

Japanese Patent Application # 2008558981 Official Action dated Nov. 2, 2011.
U.S. Appl. No. 12/522,171 Official Action dated Dec. 22, 2011.
U.S. Appl. No. 12/522,172 Official Action dated Nov. 30, 2011.
Japanese Patent Application # 2008558984 Official Action dated Nov. 1, 2011.
U.S. Appl. No. 13/043,488 Official Action dated Jan. 3, 2012.
Japanese Patent Application # 2008535179 Official Action dated Nov. 8, 2011.
Chinese Patent Application # 2006800038004.2 Official Action dated Nov. 24, 2011.
Marcia et al., "Superimposed Video Disambiguation for Increased Field of View", Optics Express 16:21, pp. 16352-16363, year 2008.
Guan et al., "Composite Structured Light Pattern for Three Dimensional Video", Optics Express 11:5, pp. 406-417, year 2008.
U.S. Appl. No. 12/522,171 Official Action dated Apr. 5, 2012.
U.S. Appl. No. 12/397,362 Official Action dated Apr. 24, 2012.
International Application PCT/IB2011/053560 Search Report dated Jan. 19, 2012.
International Application PCT/IB2011/055155 Search Report dated Apr. 20, 2012.
U.S. Appl. No. 13/036,023 Official Action dated Jan. 7, 2013.
U.S. Appl. No. 12/522,176 Official Action dated Aug. 2, 2012.
U.S. Appl. No. 12/758,047 Official Action dated Oct. 25, 2012.
Richardson, W. H., "Bayesian-Based Iterative Method of Image Restoration", Journal of the Optical Society of America, vol. 62, No. 1, pp. 55-59, Jan. 1972.
Omnivision Technologies Inc., "OV2710 1080p/720p HD Color CMOS Image Sensor with OmniPixel3-HS Technology", Dec. 2011.
U.S. Appl. No. 12/844,864 Official Action dated Dec 6, 2012.
U.S. Appl. No. 12/282,517 Official Action dated Jun. 12, 2012.
U.S. Appl. No. 12/522,172 Official Action dated Jun. 29, 2012.
U.S. Appl. No. 12/703,794 Official Action dated Aug. 7, 2012.
JP Patent Application # 2008558984 Office Action dated Jul. 3, 2012.
Japanese Patent Application # 2011-517308 Official Action dated Dec 5, 2012.
Abramson, N., "Holographic Contouring by Translation", Applied Optics Journal, vol. 15, No. 4, pp. 1018-1976, Apr. 1976.
Achan et al., "Phase Unwrapping by Minimizing Kikuchi Free Energy", IEEE International Geoscience and Remote Sensing Symposium, pp. 1738-1740, Toronto, Canada, Jun. 2002.
Theocaris et al., "Radial Gratings as Moire Gauges", Journal of Scientific Instruments (Journal of Physics E), series 2, vol. 1, year 1968.
Chinese Patent Application # 200780016625.5 Official Action dated Oct. 26, 2010.
International Application PCT/IL2009/000285 Search Report dated Jun. 11, 2009.
Brooks et al., "Moire Gauging Using Optical Interference Patterns", Applied Optics Journal, vol. 8, No. 5, pp. 935-940, May 1969.
Hovanesian et al., "Moire Contour-Sum Contour-Difference, and Vibration Analysis of Arbitrary Objects", Applied Optics Journal, vol. 10, No. 12, pp. 2734-2738, Dec. 1971.
Bryngdahl, O., "Characteristics of Superposed Patterns in Optics", Journal of Optical Society of America, vol. 66, No. 2, pp. 87-94, Feb. 1976.
International Application PCT/IL2008/000095 Search Report dated Jul. 24, 2008.
Chen et al., "Overview of Three-Dimensional Shape Measurement Using Optical Methods", Society of Photo-Optical Instrumentation Engineers Journal 39(1), pp. 10-22, Jan. 2000.
Cohen et al., "High-Resolution X-ray Diffraction for Characterization and Monitoring of Silicon-On-Insulator Fabrication Processes", Applied Physics Journal, vol. 93, No. 1, pp. 245-250, Jan. 2003.

(56) References Cited

OTHER PUBLICATIONS

Zhang et al., "Shape from intensity gradient", IEEE Transactions on Systems, Man and Cybernetics—Part A: Systems and Humans, vol. 29, No. 3, pp. 318-325, May 1999.
Doty, J.L., "Projection Moire for Remote Contour Analysis", Journal of Optical Society of America, vol. 73, No. 3, pp. 366-372, Mar. 1983.
Ben Eliezer et al., "Experimental Realization of an Imaging System with an Extended Depth of Field", Applied Optics Journal, vol. 44, No. 14, pp. 2792-2798, May 10, 2005.
Tay et al., "Grating Projection System for Surface Contour Measurement", Applied Optics Journal, vol. 44, No. 8, pp. 1393-1400, Mar. 10, 2005.
Takeda et al., "Fourier Transform Methods of Fringe-Pattern Analysis for Computer-Based Topography and Interferometry", Journal of Optical Society of America, vol. 72, No. 1, Jan. 1982.
Takasaki, H., "Moire Topography", Applied Optics Journal, vol. 12, No. 4, pp. 845-850, Apr. 1973.
Takasaki, H., "Moire Topography", Applied Optics Journal, vol. 9, No. 6, pp. 1467-1472, Jun. 1970.
Hildebrand et al., "Multiple-Wavelength and Multiple-Source Holography Applied to Contour Generation", Journal of Optical Society of America Journal, vol. 57, No. 2, pp. 155-162, Feb. 1967.
Su et al., "Application of Modulation Measurement Profilometry to Objects with Surface Holes", Applied Optics Journal, vol. 38, No. 7, pp. 1153-1158, Mar. 1, 1999.
Btendo, "Two Uni-axial Scanning Mirrors Vs One Bi-axial Scanning Mirror", Kfar Saba, Israel, Aug. 13, 2008.
Hung et al., "Time-Averaged Shadow-Moire Method for Studying Vibrations", Applied Optics Journal, vol. 16, No. 6, pp. 1717-1719, Jun. 1977.
Idesawa et al., "Scanning Moire Method and Automatic Measurement of 3-D Shapes", Applied Optics Journal, vol. 16, No. 8, pp. 2152-2162, Aug. 1977.
Iizuka, K., "Divergence-Ratio Axi-Vision Camera (Divcam): A Distance Mapping Camera", Review of Scientific Instruments 77, 0451111 (2006).
Lim et al., "Additive Type Moire with Computer Image Processing", Applied Optics Journal, vol. 28, No. 13, pp. 2677-2680, Jul. 1, 1989.
Piestun et al., "Wave Fields in Three Dimensions: Analysis and Synthesis", Journal of the Optical Society of America, vol. 13, No. 9, pp. 1837-1848, Sep. 1996.
Post et al., "Moire Methods for Engineering and Science—Moire Interferometry and Shadow Moire", Photomechanics (Topics in Applied Physics), vol. 77, pp. 151-196, Springer Berlin / Heidelberg, Jan. 1, 2000.
Chinese Patent Application # 200780006560.6 Official Action dated Oct. 11, 2010.
International Application PCT/IB2010/053430 Search Report dated Dec. 28, 2010.
Scharstein et al., "High-Accuracy Stereo Depth Maps Using Structured Light", IEEE Proceedings of the Conference on Computer Vision and Pattern Recognition, pp. 165-171, Jun. 18, 2003.
Koschan et al., "Dense Depth Maps by Active Color Illumination and Image Pyramids", Advances in Computer Vision, pp. 137-148, Springer 1997.
Marcia et al., "Fast Disambiguation of Superimposed Images for Increased Field of View", IEEE International Conference on Image Processing, San Diego, USA, Oct. 12-15, 2008.
Microvision Inc., "Micro-Electro-Mechanical System (MEMS) Scanning Mirror", years 1996-2009.
Chinese Patent Application # 200780006560.6 Official Action dated Feb. 1, 2011.
Yao Kun et al., "Measurement of Space Distribution of Laser Gaussian Beam by Speckles Displacement Method" High Power Laser and Particle Beams, vol. 12, No. 2, pp. 141-144, Apr. 30, 2000.
Lavoie et al., "3-D Object Model Recovery From 2-D Images Using Structured Light", IEEE Transactions on Instrumentation and Measurement, vol. 53, No. 2, pp. 437-443, Apr. 2004.
Chinese Application # 200780016625.5 Office Action dated May 12, 2011.
U.S. Appl. No. 11/899,542 Office Action dated Apr. 4, 2011.
U.S. Appl. No. 11/724,068 Office Action dated Mar. 1, 2011.
Chinese Application # 200780009053.8 Office Action dated Mar. 10, 2011.
Japanese Application # 2008535179 Office Action dated Apr. 1, 2011.
Kun et al., "Gaussian Laser Beam Spatial Distribution Measurement by Speckles Displacement Method", HICH Power Laser and Particle Beams, vol. 12, No. 2, Apr. 2000.
Chinese Patent Application # 200680038004.2 Official Action dated Dec. 24, 2010.
Hart, D., U.S. Appl. No. 09/616,606 "Method and System for High Resolution, Ultra Fast 3-D Imaging" filed Jul. 14, 2000.
International Application PCT/IL2007/000306 Search Report dated Oct. 2, 2008.
International Application PCT/IL20027/000262 Search Report dated Oct. 16, 2008.
International Application PCT/IL2008/000458 Search Report dated Oct. 28, 2008.
International Application PCT/IL2008/000327 Search Report dated Sep. 26, 2008.
International Application PCT/IL2006/000335 Preliminary Report on Patentability dated Apr. 24, 2008.
Sazbon et al., "Qualitative real-time range extraction for preplanned scene partitioning using laser beam coding", Pattern Recognition Letters 26, pp. 1772-1781, year 2005.
Sjodahl et al., "Measurement of shape by using projected random and patterns and temporal digital speckle photography", Applied Optics, vol. 38, No. 10, Apr. 1, 1999.
Garcia et al., "Three dimensional mapping and range measurement by means of projected speckle patterns", Applied Optics, vol. 47, No. 16, Jun. 1, 2008.
Chen et al., "Measuring of a Three-Dimensional Surface by Use of a Spatial Distance Computation", Applied Optics, vol. 42, issue 11, pp. 1958-1972, Apr. 10, 2003.
Ypsilos et al- "Speech-driven Face Synthesis from 3D Video", 2nd International Symposium on 3D Processing, Visualization and Transmission, Thessaloniki, Greece, Sep. 6-9, 2004.
Hanson et al., "Optics and Fluid Dynamics Department", Annual Progress Report for 1997 (an abstract).
Ypsilos et al., "Video-rate capture of Dynamic Face Shape and Appearance", Sixth IEEE International Conference on Automatic Face and Gesture Recognition (FGR 2004), Seoul, Korea, May 17-19, 2004.
Goodman, J.W., "Statistical Properties of Laser Speckle Patterns", Laser Speckle and Related Phenomena, pp. 9-75, Springer-Verlag, Berlin Heidelberg, 1975.
Dainty, J.C., "Introduction", Laser Speckle and Related Phenomena, pp. 1-7, Springer-Verlag, Berlin Heidelberg, 1975.
Avidan et al., "Trajectory triangulation: 3D reconstruction of moving points from amonocular image sequence", IEEE Transactions on Pattern Analysis and Machine Intelligence, vol. 22, No. 4, pp., Apr. 2000.
Leclerc et al., "The direct computation of height from shading", Proceedings of Computer Vision and Pattern Recognition, pp. 552-558, year 1991.
Zhang et al., "Height recovery from intensity gradients", Proceedings of IEEE Computer Society Conference on Computer Vision and Pattern Recognition, pp. 508-513, year 1994.
Zigelman et al., "Texture mapping using surface flattening via multi-dimensional scaling", IEEE Transactions on Visualization and Computer Graphics, 8 (2), pp. 198-207, year 2002.
Kimmel et al., Analyzing and synthesizing images by evolving curves with the Osher-Sethian method, International Journal of Computer Vision, 24(1), pp. 37-56, year 1997.
Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.
Horn, B., "Height and gradient from shading", International Journal of Computer Vision, No. 5, pp. 37-76, year 1990.
Bruckstein, A., "On shape from shading", Computer Vision, Graphics, and Image Processing, vol. 44, pp. 139-154, year 1988.

(56) References Cited

OTHER PUBLICATIONS

Zhang et al., "Rapid Shape Acquisition Using Color Structured Light and Multi-Pass Dynamic Programming", 1st International Symposium on 3D Data Processing Visualization and Transmission (3DPVT), Padova, Italy, Jul. 2002.
Besl, P., "Active Optical Range Imaging Sensors", Machine Vision and Applications, No. 1, pp. 127-152, USA 1988.
Horn et al., "Toward optimal structured light patterns", Proceedings of International Conference on Recent Advances in 3D Digital Imaging and Modeling, pp. 28-37, Ottawa, Canada, May 1997.
Mendlovic, et al., "Composite harmonic filters for scale, projection and shift invariant pattern recognition", Applied Optics, vol. 34, No. 2, pp. 310-316, Jan. 10, 1995.
Asada et al., "Determining Surface Orientation by Projecting a Stripe Pattern", IEEE Transactions on Pattern Analysis and Machine Intelligence, vol. 10, No. 5, year 1988.
Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.
EZconn Czech A.S., "Site Presentation", Oct. 2009.
Zhu et al., "Fusion of Time-of-Flight Depth and Stereo for High Accuracy Depth Maps", Proceedings of the IEEE Conference on Computer Vision and Pattern Recognition, Anchorage, USA, Jun. 24-26, 2008.
Luxtera Inc., "Luxtera Announces World's First 10GBit CMOS Photonics Platform", Carlsbad, USA, Mar. 28, 2005 (press release).
Lee et al., "Variable Pulse Mode Driving IR Source Based 3D Robotic Camera", MVA2005 IAPR Conference on Machine Vision Applications, pp. 530-533, Japan, May 16-18, 2005.
Mordohai et al., "Tensor Voting: A Perceptual Organization Approach to Computer Vision and Machine Learning", Synthesis Lectures on Image, Video and Multimedia Processing, issue No. 8, Publishers Morgan and Claypool, year 2006.
Beraldin et al., "Active 3D Sensing", Scuola Normale Superiore PISA, vol. 10, pp. 22-46, Apr. 2000.
Bhat et al., "Ordinal Measures for Image Correspondence", IEEE Transactions on Pattern Analysis and Machine Intelligence, vol. 20, No. 4, pp. 415-423, Apr. 1998.
Bradley et al., "Synchronization and Rolling Shutter Compensation for Consumer Video Camera Arrays", IEEE International Workshop on Projector-Camera Systems—PROCAMS 2009 (Miami Beach, Florida, 2009).
De Piero et al., "3D Computer Vision Using Structured Light: Design Calibration and Implementation Issues", Advances in Computers, vol. 43, pp. 243-278, Academic Press 1996.
Hongjun et al., "Shape Measurement by Digital Speckle Temporal Sequence Correlation Method", Acta Optica Sinica Journal, vol. 21, No. 10, pp. 1208-1213, Oct. 2001 (with English abstract).
Hongjun, D., "Digital Speckle Temporal Sequence Correlation Method and the Application in Three-Dimensional Shape Measurement", Chinese Doctoral Dissertations & Master's Theses, Full-text Database (Master) Basic Sciences, No. 1, Mar. 15, 2004.
Hsueh et al., "Real-time 3D Topography by Speckle Image Correlation", Proceedings of SPIE Conference on Input/Output and Imaging Technologies, vol. 3422, pp. 108-112, Taiwan, Jul. 1998.
Chinese Patent Application # 200780009053.8 Official Action dated Apr. 15, 2010 (English translation).
Chinese Patent Application # 200680038004.2 Official Action dated Mar. 30, 2010 (English translation).
Chinese Patent Application # 200680038004.2 Official Action dated Aug. 3, 2011 (English translation).
Engfield, N., "Use of Pseudorandom Encoded Grid in U.S. Appl. No. 11/899,542", Andrews Robichaud, Jun. 22, 2011.
U.S. Appl. No. 12/844,864 Office Action dated Sep. 26, 2013.
U.S. Appl. No. 13/921,224 Office Action dated Oct. 3, 2013.
U.S. Appl. No. 12/958,427 Office Action dated Nov. 22, 2013.
U.S. Appl. No. 13/567,095 Office Action dated Oct. 1, 2013.
U.S. Appl. No. 13/008,042 Office Action dated Dec. 3, 2013.
Fienup, J.R., "Phase Retrieval Algorithms: A Comparison", Applied Optics, vol. 21, No. 15, Aug. 1, 1982.
International Application PCT/IL2008/01592 Search Report dated Apr. 3, 2009.
U.S. Appl. No. 12/840,312 Office Action dated Jul. 12, 2012.
Gerchberg et al., "A Practical Algorithm for the Determination of the Phase from Image and Diffraction Plane Pictures," Journal Optik, vol. 35, No. 2, pp. 237-246, year 1972.
Sazbon et al., "Qualitative Real-Time Range Extraction for Preplanned Scene Partitioning Using Laser Beam Coding," Pattern Recognition Letters 26 , pp. 1772-1781, year 2005.
Moharam et al. "Rigorous coupled-wave analysis of planar-grating diffraction", Journal of the Optical Society of America, vol. 71, No. 6, pp. 818-818, Jul. 1981.
U.S. Appl. No. 12/945,908 Official Action dated Dec. 5, 2012.
Eisen et al., "Total internal reflection diffraction grating in conical mounting" ,Optical Communications 261, pp. 13-18, year 2006.
O'Shea et al., "Diffractive Optics: Design, Fabrication and Test", SPIE Tutorial Texts in Optical Engineering, vol. TT62, pp. 66-72, SPIE Press, USA 2004.
U.S. Appl. No. 13/008,042 Official Action dated Jan. 3, 2013.
Shpunt et al., U.S. Appl. No. 61/764,554, filed Feb. 14, 2013.
U.S. Appl. No. 12/330,766 Official Action dated Dec. 14, 2010.
Ezconn Czech A.S. "Site Presentation", Oct. 2009.
Bradley et al., "Synchronization and Rolling Shutter Compensation for Consumer Video Camera Arrays", IEEE International Workshop on Projector-Camera Systems—PROCAMS 2009, Miami Beach, Florida, 2009.
U.S. Appl. No. 12/955,940 Office Action dated Jun. 27, 2012.
European Patent Application # 11150668.9 Partial European Search Report dated Apr. 1, 2011.
U.S. Appl. No. 12/330,766 Official Action dated Jun. 7, 2011.
Garcia et al., "Three-dimensional mapping and range measurement by means of projected speckle patterns", Applied Optics, vol. 47, No. 16, pp. 3032-3040, Jun. 1, 2008.
Garcia et al.., "Projection of Speckle Patterns for 3D Sensing", Journal of Physics, Conference series 139, year 2008.
CN Patent Application # 200880119911.9 Office Action dated Jan 29, 2012.
U.S. Appl. No. 12/955,939 Office Action dated Jan 30, 2012.
U.S. Appl. No. 12/955,940 Office Action dated Jan 11, 2012.
U.S. Appl. No. 12/762,373 Office Action dated Mar. 7, 2012.
International Application PCT/IB2011/053560 Search Report dated Jan 19, 2012.
U.S. Appl. No. 12/955,939 Office Action dated Jun. 1, 2012.
Shpunt et al., U.S. Appl. No. 61/786,711, filed Mar. 15, 2013.
Mor, Z., U.S. Appl. No. 61/836,682, filed Jun. 19, 2013.
Chayat et al., U.S. Appl. No. 13/798,231, filed Mar. 13, 2013.
U.S. Appl. No. 12/330,766 Office Action dated Jul. 16, 2013.
International Application PCT/IB2013/051986 Search Report dated Jul. 30, 2013.
U.S. Appl. No. 13/008,042 Office Action dated Jul. 15, 2013.
Korean Patent Application # 10-2008-7025030 Office Action dated Feb. 25, 2013.
U.S. Appl. No. 12/707,678 Office Action dated Feb. 26, 2013.
U.S. Appl. No. 12/758,047 Office Action dated Apr. 25, 2013.
U.S. Appl. No. 12/844,864 Office Action dated Apr. 11, 2013.
U.S. Appl. No. 13/036,023 Office Action dated Sep. 3, 2013.
Japanese Patent Application # 2011517308 Office Action dated Jun. 19, 2013.
U.S. Appl. No. 13/036,023 Office Action dated Jul. 17, 2013.
U.S. Appl. No. 12/707,678 Office Action dated Jun. 20, 2013.
International Application PCT/IB2013/051189 Search Report dated Jun. 18, 2013.
U.S. Appl. No. 13/907,998 Office Action dated Apr. 8, 2015.

* cited by examiner

DEPTH MAPPING USING TIME-CODED ILLUMINATION

CROSS-REFERENCE TO RELATED APPLICATION

This application claims the benefit of U.S. Provisional Patent Application 61/415,352, filed Nov. 19, 2010, which is incorporated herein by reference.

FIELD OF THE INVENTION

The present invention relates generally to computer vision, and specifically to three-dimensional (3D) mapping and imaging.

BACKGROUND OF THE INVENTION

Various methods are known in the art for optical 3D mapping, i.e., generating a 3D profile of the surface of an object by processing an optical image of the object. This sort of 3D profile is also referred to as a depth map or depth image, and 3D mapping is also referred to as depth mapping.

Some methods of 3D mapping are based on projecting a laser speckle pattern onto the object, and then analyzing an image of the pattern on the object. For example, PCT International Publication WO 2007/043036, whose disclosure is incorporated herein by reference, describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real-time reconstruction of a 3D map of the object. Further methods for 3D mapping using speckle patterns are described, for example, in PCT International Publication WO 2007/105205, whose disclosure is also incorporated herein by reference.

Other methods of optical 3D mapping project different sorts of patterns onto the object to be mapped. For example, PCT International Publication WO 2008/120217, whose disclosure is incorporated herein by reference, describes an illumination assembly for 3D mapping that includes a single transparency containing a fixed pattern of spots. A light source transilluminates the transparency with optical radiation so as to project the pattern onto an object. An image capture assembly captures an image of the pattern on the object, and the image is processed so as to reconstruct a 3D map of the object.

SUMMARY

Embodiments of the present invention that are described hereinbelow provide improved methods and apparatus for 3D mapping.

There is therefore provided, in accordance with an embodiment of the present invention, a method for depth mapping, which includes illuminating an object with a time-coded pattern and capturing images of the time-coded pattern on the object using a matrix of detector elements. The time-coded pattern in the captured images is decoded using processing circuitry embedded in each of the detector elements so as to generate respective digital shift values, which are converted into depth coordinates.

In some embodiments, illuminating the object includes projecting a temporal sequence of spatial patterns of light onto the object, wherein the spatial patterns may include alternating bright and dark stripes, having a different, respective spatial frequency in each of the spatial patterns. Alternatively or additionally, the spatial patterns may include one or more gray-scale patterns.

Further additionally or alternatively, capturing the images includes capturing multiple successive image frames, wherein the temporal sequence extends over a given number of the successive image frames, and decoding the time-coded pattern includes combining signals from the given number of the successive image frames.

Projecting the temporal sequence may include scanning an illumination beam along a first axis, while modulating the beam, and applying a cylindrical optical element to generate the spatial patterns by spreading the modulated beam along a second axis, perpendicular to the first axis. Alternatively, projecting the temporal sequence may include providing a patterned element including multiple areas, which when illuminated, created respective ones of the spatial patterns, and illuminating the areas sequentially so as to project the temporal sequence of the spatial patterns.

In some embodiments, capturing the images includes generating electrical charge in each of the detector elements responsively to the time-coded pattern, and decoding the pattern includes switching the charge among different charge storage components in each of the detector elements in synchronization with the time-coded pattern. In a disclosed embodiment, the temporal sequence and switching the charge are synchronized by a global clock, and decoding the pattern includes reading data out of the matrix of the detector elements under control of a local clock, which is unsynchronized with the global clock. Typically, the matrix includes multiple rows of the detector elements, and reading the data out includes outputting the data from the detector elements row by row using a rolling shutter controlled by the local clock.

In a disclosed embodiment, decoding the pattern includes making a comparison of the charge stored in each of the charge storage components to a threshold level, generating bit values responsively to the comparison, and concatenating the bit values to generate the respective digital shift values.

Additionally or alternatively, decoding the pattern includes combining signals from the charge storage components in groups of neighboring detector elements so as to provide the depth coordinates with enhanced depth resolution.

In another embodiment, illuminating the object includes projecting a temporal sequence of spatial patterns of light onto the object, and capturing the images includes capturing multiple successive image frames, wherein the temporal sequence extends over a given number of the successive image frames, and decoding the pattern includes combining signals from the given number of the successive image frames while combining the signals from groups of neighboring detector elements.

Typically, decoding the pattern includes storing reference values corresponding to an image of the time-coded pattern at a predefined reference frame, and decoding the pattern includes generating respective output words from the detector elements based on a captured image, and taking differences between the respective output words and the stored reference values in order to find the digital shift values. Converting the shift values may include generating a depth map of the object by triangulation of the digital shift values.

There is also provided, in accordance with an embodiment of the present invention, a method for imaging, which includes capturing images of an object using a matrix of detector elements. A processing operation is performed in the detector elements under control of a global clock. Results of the processing operation are read out under control of a rolling clock, which is unsynchronized with the global clock.

In a disclosed embodiment, capturing the images includes generating electrical charge in each of the detector elements, and performing the processing operation includes applying a logical operation to the charge in each of the detector elements in order to generate a digital value, which is read out under the control of the rolling clock. Capturing the images may include illuminating the object with radiation that varies over time under the control of the global clock, and generating the charge responsively to the radiation that is received from the object at the detector elements.

There is additionally provided, in accordance with an embodiment of the present invention, apparatus for depth mapping, including an illumination subassembly, which is configured to illuminate an object with a time-coded pattern. An image capture subassembly includes a matrix of detector elements configured to capture images of the time-coded pattern on the object. Processing circuitry is embedded in each of the detector elements and is configured to decode the time-coded pattern in the captured images so as to provide signals indicative of respective digital shift values. A processor is configured to convert the shift values into depth coordinates.

There is further provided, in accordance with an embodiment of the present invention, apparatus for imaging, which includes a matrix of detector elements, which is configured to capture images of an object. Embedded processing circuitry is configured to perform a processing operation in the detector elements under control of a global clock. A readout circuit is configured to read out results of the processing operation under control of a rolling clock, which is unsynchronized with the global clock.

There is moreover provided, in accordance with an embodiment of the present invention, projection apparatus, including a radiation source, which is configured to generate an illumination beam, and scanning optics, which are configured to scan the illumination beam along a first axis. A control circuit is coupled to modulate the illumination beam while the beam is scanned. A cylindrical optical element is configured to generate one or more spatial patterns by spreading the modulated beam along a second axis, perpendicular to the first axis.

In a disclosed embodiment, the control circuit is configured to pulse the illumination beam on and off while the beam is scanned so as to generate a pattern of stripes along the second axis. A modulation of the illumination beam may be varied so as to generate the stripes with different widths.

There is furthermore provided, in accordance with an embodiment of the present invention, projection apparatus, which includes a patterned element including multiple areas, which when illuminated, create different, respective spatial patterns. At least one radiation source is configured to illuminate the areas sequentially so as to project the spatial patterns in a temporal sequence.

In a disclosed embodiment, the at least one radiation source includes an array of radiation sources, which are configured to irradiate different, respective ones of the areas, and the apparatus includes a control circuit, which is coupled to turn the radiation sources on and off in succession so as to create the temporal sequence of the spatial patterns.

The present invention will be more fully understood from the following detailed description of the embodiments thereof, taken together with the drawings in which:

DETAILED DESCRIPTION OF EMBODIMENTS

Pattern-based systems and methods for depth mapping such as those described in the Background section above require that a processor perform multiple correlation computations in order to find the local shift of each pixel or group of pixels relative to a reference image. The computations require substantial computing and/or hardware logic resources and are limited in the spatial resolution that they are able to achieve.

Figure 1:
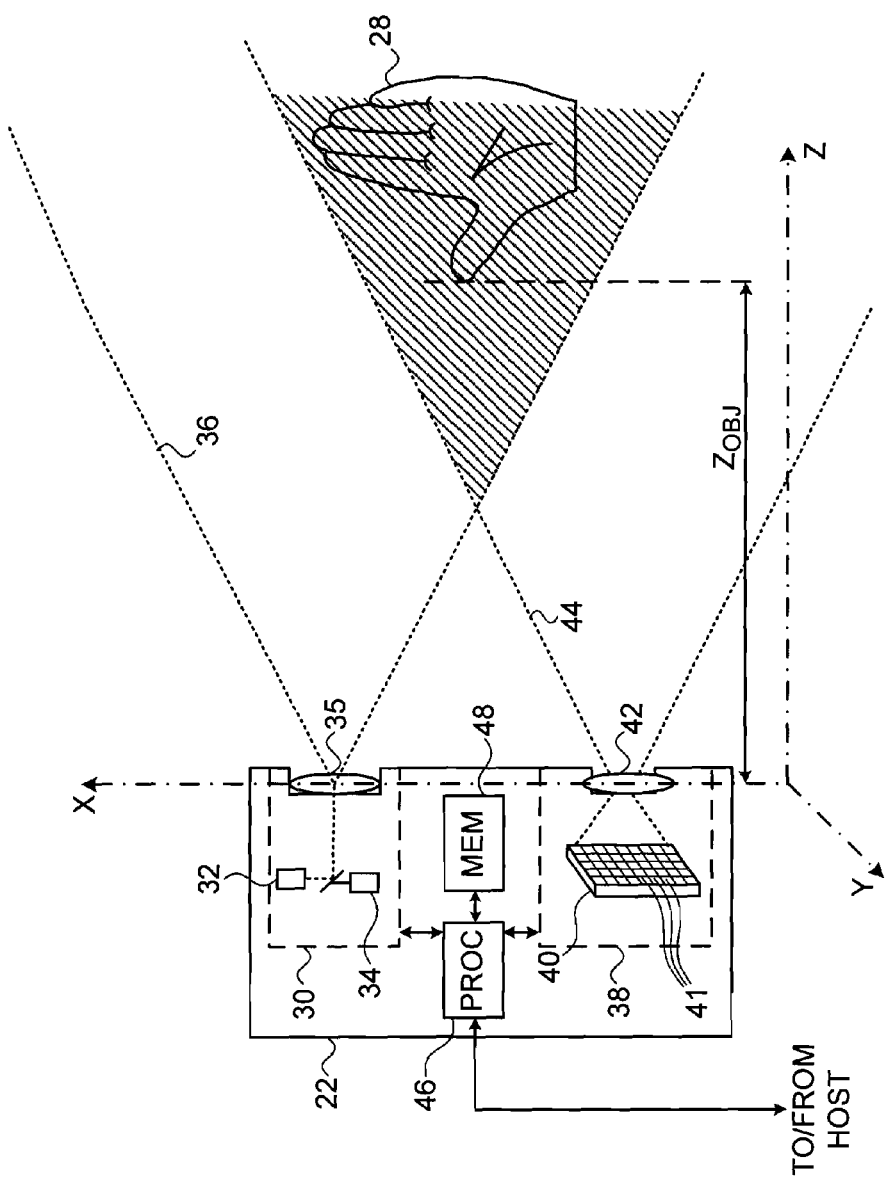
FIG. 1 is a schematic side view of an imaging device for 3D mapping, in accordance with an embodiment of the present invention.

Embodiments of the present invention that are described hereinbelow provide circuits and methods that can be used to overcome these limitations by using time-coded illumination in combination with an image sensor that decodes the time coding at each pixel. The resulting system is thus able to provide a digital shift value for each pixel simply by digital subtraction, with no need for correlation or other complex computations. The shift value is converted to depth by triangulation, as in other pattern-based depth mapping systems. FIG. 1 is a schematic top view of an imaging device 22 for 3D mapping, in accordance with an embodiment of the present invention. Imaging device 22 is configured to capture images and generate 3D maps of a scene. The scene here includes an object 28, such as the hand of a user of the device, which is located at a distance $Z_{OBJ}$ from device 22. The depth information in the 3D maps generated by device 22 may be used by a host computer as part of a 3D user interface, which enables the user to interact with games and other applications running on the computer and with elements shown on a display screen. (This sort of functionality is described, for example, in U.S. Patent Application Publication 2009/0183125, whose disclosure is incorporated herein by reference.) This particular application of device 22 is mentioned here only by way of example, however, and the 3D mapping capabilities of the device may be used for other purposes, as well, and applied to substantially any suitable types of scenes and 3D objects.

In the example shown in FIG. 1, an illumination subassembly 30 in imaging device 22 projects a time-coded pattern of optical radiation onto object 28, as will be explained hereinbelow. The optical radiation that is used for this purpose is typically in the infrared (IR) range, but visible or ultraviolet radiation may similarly be used. (The term "optical radiation," as used in the context of the present patent application and in the claims, refers to electromagnetic radiation in any or all of the visible, infrared, and ultraviolet ranges, which is equivalently referred to as visible, infrared, or ultraviolet light.) An image capture subassembly 38 captures and decodes images of the pattern on the object in order to generate a digital shift value for each pixel.

A processor 46 in device 22 processes the shift values in order to generate a depth map of object 28, i.e., an array of 3D coordinates, comprising a depth (Z) coordinate value of the surface of the object at each point (X,Y) within a predefined field of view. (In the context of an array of image-related data, these (X,Y) points are also referred to as pixels.) In the present embodiment, the processor computes the 3D coordinates of points on the surface of the object 28 by triangulation, based on the transverse shift of the pattern at each pixel. The principles of the triangulation computation are described in the above-mentioned PCT publications WO 2007/043036, WO 2007/105205 and WO 2008/120217. This sort of technique is referred to herein generally as "pattern-based depth mapping." The embodiments described in the present patent application use time-coded illumination patterns and dedicated decoding circuitry to provide processor 46 with the transverse shift value at each pixel accurately and efficiently.

In FIG. 1, the X-axis is taken to be the horizontal direction along the front of device 22, the Y-axis is the vertical direction (out of the page in this view), and the Z-axis extends away from device 22 in the general direction of the object being imaged by the assembly. The optical axes of subassemblies 30 and 38 are parallel to the Z-axis, with respective pupils on the X-axis at a known distance apart. This sort of arrangement is useful in simplifying the shift-based computations performed by processor 46, but other optical arrangements may alternatively be used to implement the principles described herein, and these alternative arrangements are considered to be within the scope of the present invention.

Figure 4A:
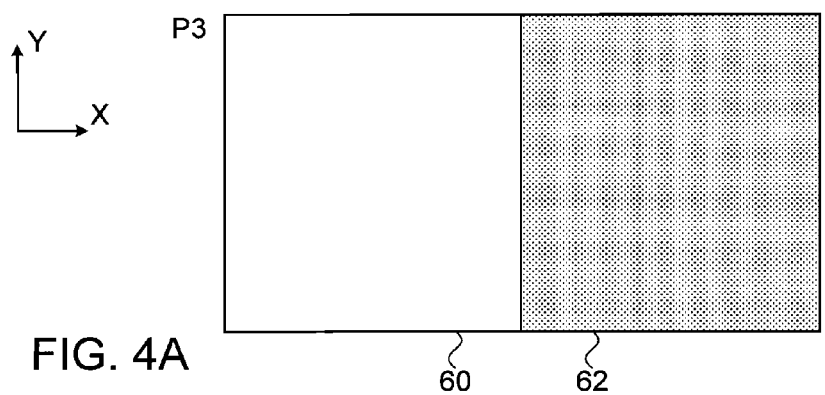
FIGS. 4A, 4B and 4C schematically show patterns projected by an illumination subassembly, in accordance with an embodiment of the present invention.
Figure 4B:
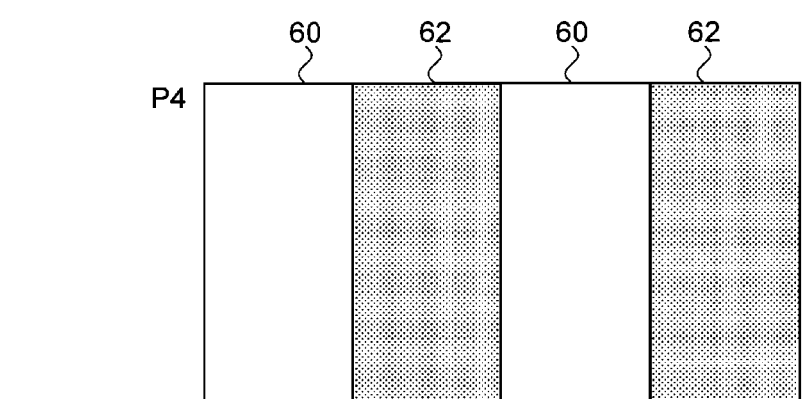
Figure 4C:
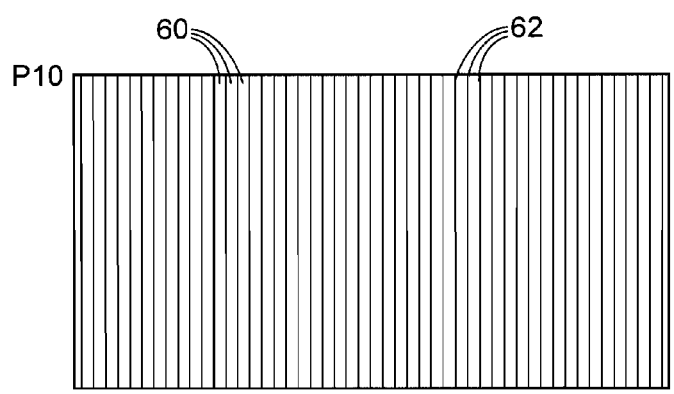

As noted above, illumination subassembly 30 illuminates the scene of interest with a time-coded pattern, such as a succession of patterns of vertical stripes, wherein the stripe width varies in time. Such a pattern is illustrated in FIGS. 4A-4C and is described hereinbelow with reference thereto. To generate this sort of pattern, subassembly 30 typically comprises a suitable radiation source 32, such as a collimated diode laser or an appropriately shaped light-emitting diode (LED) or other light source, along with scanning optics, such as a scanning minor 34 and projection optics 35. The beam from source 32 is modulated, for example, pulsed on and off, during each excursion of scanning minor 34 along the X-axis, with modulation timed to generate the stripes with the desired spatial frequencies. Optics 35 may comprise a cylindrical lens or other cylindrical optical element, which spreads the output spot from source 32 into an output stripe along the Y-direction. In this case, it is sufficient that minor 34 scan in a single dimension, along the X-axis. The pattern is projected onto the scene in a diverging beam 36. Alternatively, a two-dimensional scanning mirror, which may be driven using micro-electro-mechanical system (MEMS) technology, for example, in conjunction with a collimated laser diode can be used to create a full two-dimensional illumination pattern.

Figure 6:
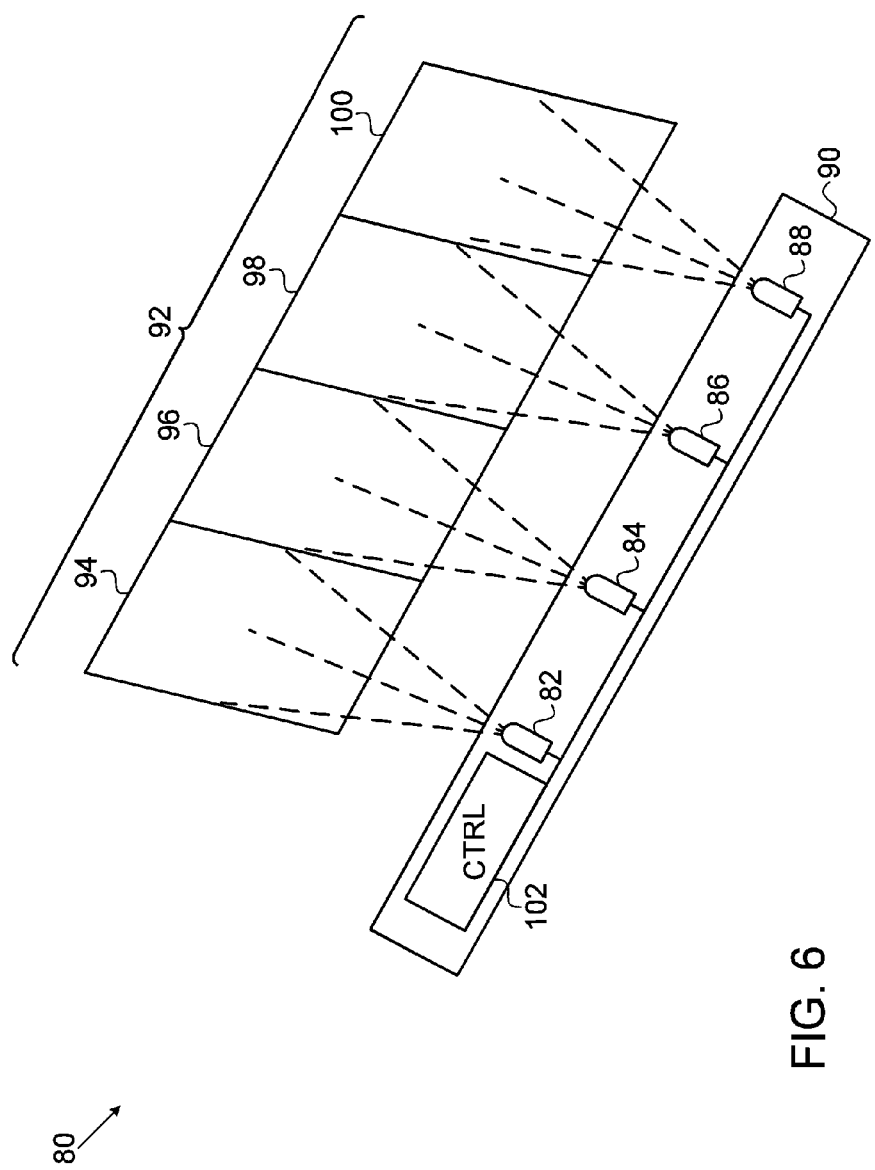
FIG. 6 is a schematic pictorial view of an illumination subassembly, in accordance with an embodiment of the present invention.

Further alternatively, other sorts of illumination subassemblies may be used to create the time-coded pattern. For example, a spatial light modulator may be driven to generate the pattern over the entire field of view simultaneously, without scanning. As another example, an array of parallel radiation sources may be modulated, for example sequentially turned on and off in turn, with appropriate timing to create the time-coded pattern. In this latter case, the radiation sources may be associated with suitable patterned optics, such as a diffractive optical element (DOE) or micro-lens array (MLA), for projection of the pattern. The density and/or other aspects of the pattern may vary across the surface of the optics, so that as each radiation source is turned on, it creates a different spatial pattern in the time-coded sequence. An embodiment of this sort is shown in FIG. 6.

Image capture subassembly 38 typically comprises objective optics 42, which image the scene onto a detector 40, which may be based on CMOS image sensor technology, comprising a matrix of detector elements 41. The rows and columns of the matrix are aligned with the X and Y axes. Each element 41 of detector 40 comprises a local processing circuit, which generates the digital shift value of the corresponding pixel. The detector and objective optics define a field of view 44, which is typically contained within beam 36 in the region of interest of device 22.

As noted above, radiation source 32 typically emits IR radiation. Detector 40 may comprise a monochrome image sensor, without an IR-cutoff filter, in order to detect the image of the projected pattern with high sensitivity. To enhance the contrast of the image captured by detector 40, optics 42 or the detector itself may comprise a bandpass filter (not shown), which passes the wavelength of radiation source 32 while blocking ambient radiation in other bands.

Processor 46 typically comprises an embedded microprocessor, which is programmed in software (or firmware) to carry out the processing functions that are described herein. A memory 48 may hold program code, lookup tables, and/or interim computational results. Alternatively or additionally, processor 46 may comprise programmable hardware logic circuits for carrying out some or all of its functions.

Figure 2:
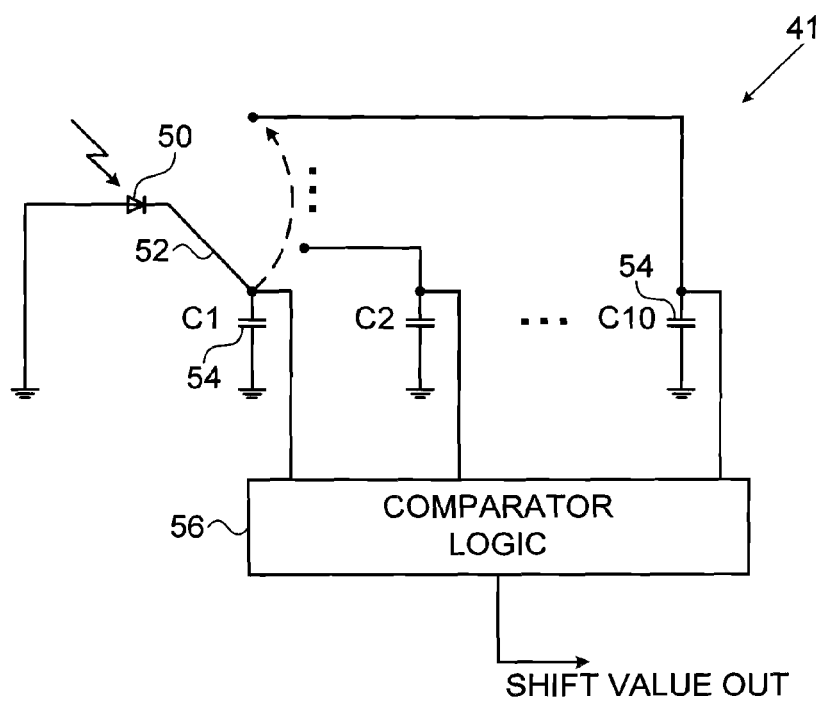
FIG. 2 is a schematic circuit diagram showing a detector element with an embedded processing circuit, in accordance with an embodiment of the present invention.

FIG. 2 is a schematic circuit diagram showing processing circuits embedded in each of detector elements 41 in detector 40, in accordance with an embodiment of the present invention. All of the components of detector 40, including both light sensing and logic circuits, may be produced by standard CMOS processes, such as are currently used in producing CMOS image sensors.

A photodiode 50 or other light-sensitive component in each element 41 generates a flow of electrons in response to incident photons. The processing circuitry in each element 41 includes at least a switch 52 and multiple charge storage components, such as capacitors 54. Switch 52 is coupled to the output of photodiode 50 and switches among capacitors 54, which store the electron charge. In this example, element 41 comprises an array of ten capacitors, but larger or smaller numbers of capacitors may be used depending on the desired shift resolution. Comparator logic 56 converts the charge stored by the capacitors into a signal indicative of a digital shift value, which is then read out of detector 40 to processor 46. This readout is typically performed in raster sequence with the shift values of the other detector elements, so that the shift values are read out in the same manner as pixel values are read out of a conventional image sensor.

Alternatively, at least a portion of comparator logic 56 (which is described in greater detail hereinbelow) may be located at the edge of the array of detector elements 41, rather than embedded in each detector element as shown here. Further alternatively or additionally, some or all of the raw signals captured by capacitors 54 may be transferred from detector 40 to processor 46, which then performs the shift computation at the picture level. As yet another alternative, comparator logic 56 may perform numerical and/or trigonometric operations on the raw signals, as well as comparison between the readings of the capacitors.

Figure 3:
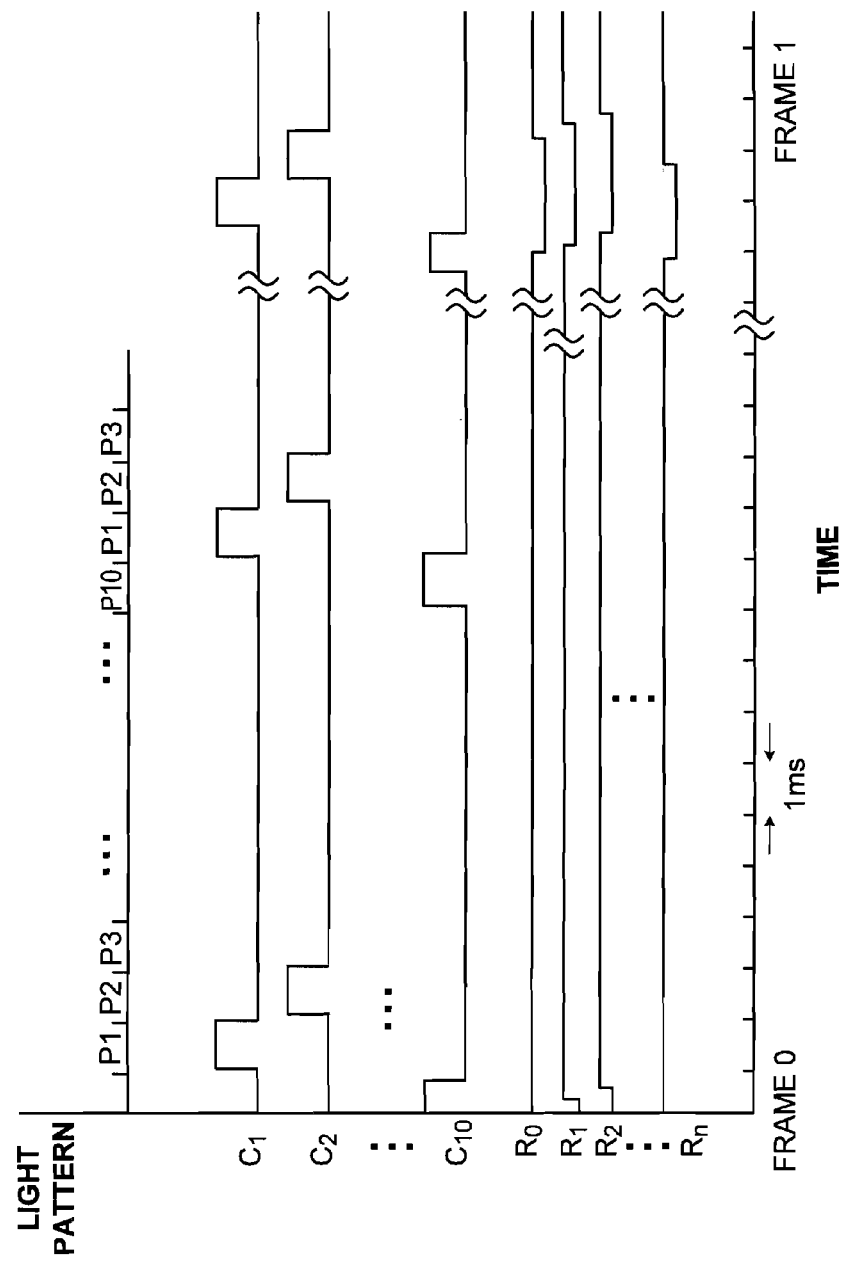
FIG. 3 is a timing diagram that schematically illustrates the operation of an illumination subassembly and detector elements in an imaging device for 3D mapping, in accordance with an embodiment of the present invention.

FIG. 3 is a timing diagram that schematically illustrates the operation of illumination subassembly 30 and detector elements 41, in accordance with an embodiment of the present invention. The illumination subassembly generates a temporal sequence of ten different spatial patterns of light, identified in FIG. 3 as P1 through P10. (A possible sequence of this sort is described hereinbelow with reference to FIGS.

4A-4C.) This sort of temporal sequence of different spatial light patterns is referred to herein as a time-coded illumination sequence or pattern.

The patterns are projected by subassembly 30 in predetermined time intervals. In this example, the intervals are 1 ms apart, but longer or shorter intervals may be used. Much longer intervals are generally undesirable if the object to be mapped is moving. Shorter intervals are possible, but may complicate and increase the power consumption of the circuitry. The millisecond-scale interval is convenient in that it can be implemented using low-speed timing and switching circuits and generates only moderate data transfer rates.

During each of the projection intervals, switch 52 conveys the charge from photodiode 50 to a different capacitor 54. The switch in each detector element 41 is synchronized with the alternation of the light pattern that is projected by illumination subassembly 30. Thus, capacitor C1 receives the charge during the interval of pattern P1, C2 during P2, and so forth up to C10 and P10, after which the sequence repeats, as illustrated by the lines marked C1, C2, . . . , C10 in FIG. 2. Consequently, the intensity of light that is incident on detector element 41 due to each of the light patterns is recorded by the respective capacitor. Repetition of the pattern (every 10 ms in this example) is useful in averaging out artifacts that may arise due to motion of object 28.

Switches 52 in all elements 41 of detector 40 are typically synchronized by a global clock, i.e., all of the switches operate at the same time and in the same way in order to match the timing of the varying light patterns. On the other hand, readout of the values collected and stored by elements 41 may be performed row-by-row, using a local clock, in a "rolling shutter" arrangement, for example. In this scheme, the readout periods of the successive rows R0, R1, . . . , Rn of elements 41 are staggered over the duration of each frame. (The readout period of each row is illustrated by the short period during which the signal for the row is shown to go low in FIG. 3.) The use of a rolling shutter for readout, notwithstanding the global timing of the switches, may be advantageous in terms of ease of implementation and enhanced overall sensitivity to light. The lack of synchronization between the global clock that controls the illumination and sensing and the local clock that controls readout has no adverse effect on the performance of device 22.

This sort of hybrid approach, in which switching operations within the detector elements in a matrix are globally clocked, while readout is controlled separately row by row, by a rolling clock, may similarly be used in implementing other sorts of local processing functions, as well.

FIGS. 4A, 4B and 4C schematically show patterns P3, P4, and P10, respectively, according to an embodiment of the present invention. These patterns comprise bright stripes 60 and dark stripes 62, wherein the widths (i.e., the spatial frequencies) of the stripes vary from pattern to pattern. Pattern P1 may be totally bright, while P2 is totally dark, in order to provide baseline values for comparator logic 56. In P3 (FIG. 4A), stripes 60 and 62 each take up half the field. Assuming sensor 40 to comprises 256 columns of detector elements 41, illumination subassembly 30 may be controlled so that the stripes in P3 are each 128 pixels wide. In P4 (FIG. 4B), the alternating bright and dark stripes are 64 pixels wide. The stripe widths decrease by half in each successive interval: P5—32 pixels; P6—16 pixels; P7—8 pixels; P8—4 pixels; P9—2 pixels; P10 (FIG. 4C—stripes not to scale)—one pixel.

This succession of patterns associates a unique eight-bit code with each X-coordinate value. Each bit of the code corresponds to the bright/dark status of the column of pixels at that X-coordinate in an image of a reference plane during the corresponding interval, from P3 through P10. (The reference plane is located at a known distance from device 22 and is used as the baseline Z-coordinate for converting X-direction shift values to Z-direction depth values by triangulation.) Associating the value 1 with bright stripes 60, and 0 with dark stripes 62, the leftmost column will have the value (1111111), since the pixels in this column are bright during every one of the intervals, whereas the rightmost column will be (00000000). The binary code values of the intermediate columns increase in succession from right to left.

Alternatively, any other suitable sort of time-coded sequences of patterns may be used. The use of vertically-striped patterns is appropriate in the system configuration shown in FIG. 1, since depth variations will result only in X-direction shifts of the pattern (as explained in the above-mentioned PCT publications). Hence, no Y-direction coding is required. Alternatively, however, in other schemes, the Y-coordinates may be coded, as well.

As another example, in some cases it may be advantageous to use multiple frames of time-coded data to derive depth. For example, instead of using a single frame with ten storage components in each detector element as in the embodiment described above, depth data can be derived by combining signals from a given number of successive frames, using four storage components in each detector element, with each time-coded sequence of projected patterns extending over the given number of successive frames. In this sort of embodiment, a detector with a high frame rate (for example, 100 frames/sec or more) can be used in order to reduce the influence of motion artifacts on depth measurement.

Another alternative is to group neighboring detector elements: For instance, with four storage components in each detector element, a group of four neighboring elements will have 16 storage components. The signals from the neighboring detector elements in each such group can be combined to provide depth readings with enhanced depth resolution. For this purpose, the storage components in the different detector elements in the group may be clocked at different times, so that each storage component receives charge due to projection of a different pattern. Alternatively, the projected patterns may be modified to provide local spatial coding over the different detector elements in each group, without necessarily applying different clocks to the different elements. In this manner, the local spatial information can be combined with temporal information to decode the patterns and thus extract local shift (and hence depth) information.

In another embodiment, both of the above alternatives may be combined: The time-coded sequence of projected patterns may extended over multiple successive frames, and the patterns may be decoded by grouping neighboring detector elements. This sort of embodiment can be designed, with appropriate local spatial coding of the patterns, to use a conventional image sensor array, in which each detector element contains only a single storage component.

In practical terms, it may be difficult in some circumstances to properly distinguish between the binary values 0 and 1 at each pixel, especially when projecting the pattern with the finest spatial resolution. Furthermore, use of gray-scale patterns can be advantageous in achieving sub-pixel resolution in the shift computation. Thus, in an alternative embodiment, binary patterns (at low resolution) may be projected in alternation with grey-scale patterns, and the results may be combined to measure depth with enhanced reliability and resolution. The gray-scale pattern may comprise, for example, a shifted-sine pattern, such as that described by Guan et al., in "Composite Structured Light Pattern for Three- Dimensional Video," *Optics Express* 11:5 (2003), pages 406-417, which is incorporated herein by reference.

Figure 5:
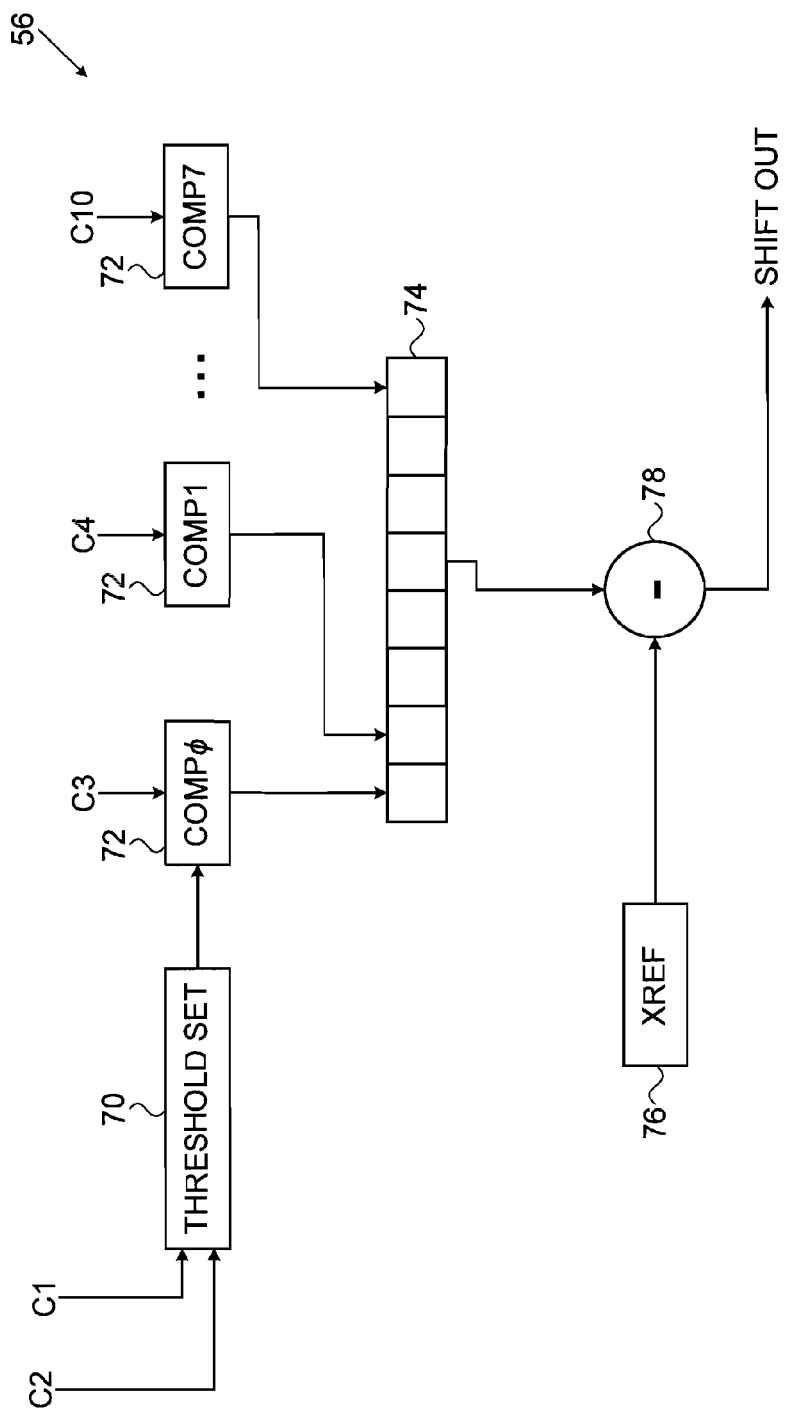
FIG. 5 is a block diagram that schematically shows details of comparator logic in a processing circuit embedded in an imaging device, in accordance with an embodiment of the present invention.

FIG. 5 is a block diagram that schematically shows details of comparator logic 56, in accordance with an embodiment of the present invention. The charge values (or equivalent voltages) of capacitors C1 and C2 are input to a threshold setting block 70 As explained above, switch 52 in each detector element 41 is synchronized so that these capacitors respectively receive the charge output by photodiode 50 while illumination subassembly 30 projects patterns P1 and P2. Assuming pattern P1 is all bright and P2 is all dark, C1 and C2 will give the signal bounds for each pixel: C1 indicates the expected signal level when the pixel is illuminated by subsequent patterns, while C2 indicates the baseline "dark" level due to ambient light.

Block 70 sets one or more discrimination thresholds based on the C1 and C2 values. For example, a single threshold may be set at the average of C1 and C2. This threshold is input to an array of comparators 72, one for each of the remaining capacitors 54, C3 through C10. Alternatively, the threshold can be set as the average of max(C1, . . . ,C10) and min(C1, . . . ,C10) (on the assumption that there is no word of ten zeros or ten ones). In this alternative scheme, the values of C1 and C2 can provide useful depth information, rather than being used only for threshold setting.

As an alternative to the sort of threshold-based discrimination that is described above, complementary patterns (such as 101010 and 010101) may be projected in alternation. The resulting signals are compared locally in each detector element 41. If the first signal at a given pixel is larger than the second by at least a certain minimum difference, then it is assigned the value 1. Otherwise it gets the value 0.

Each comparator 72 compares the charge level of the respective capacitor to the threshold and outputs a bit value accordingly, for example, a "1" if the charge level is above threshold, and "0" if below. Alternatively, a single comparator (or an intermediate number of comparators) may be multiplexed among the capacitors. The result, in the example shown in FIG. 5, is an eight-bit output word 74, in which the MSB (contributed by C3) represents the bright/dark status of the corresponding pixel due to pattern P3, and the LSB (C10) represents the status due to P10. The comparison is typically performed at the conclusion of each cycle through the set of patterns P1 through P10, and the capacitors are then cleared for the next cycle.

If the image captured by subassembly 38 during a given cycle is of a flat object at the above-mentioned reference plane, then the value of word 74 will be the reference code value, XREF, for the corresponding X-coordinate. This reference value may be stored in a register 76 for each column of detector elements 41. A subtractor 78 takes a difference between the reference value in register 76 from the current value of word 74 in order to give the digital value of the X-direction shift of the pattern at this pixel. Processor 46 translates the shift into the corresponding depth value. Alternatively, detector 40 may simply output raw words 74, and the subtraction may be performed by processor 46 or other circuitry. Further alternatively, detector elements 41 may comprise additional arithmetic logic to convert the shifts into depth values, so that detector 40 outputs a depth map directly.

Alternative implementations of the capacitors and associated logic may also be used. For example, a smaller number of capacitors may be incorporated in each detector element 41, and the operation of switch 52 may be timed so that each capacitor receives charge during two (or more) of the pattern intervals. In this case, each capacitor may store two (or more) bits of information as analog charge levels. Comparator logic 56 may then apply multiple thresholds in order to distinguish between the possible charge states and extract the appropriate multi-bit values from each capacitor.

FIG. 6 is a schematic pictorial view of an illumination subassembly 80, which is operative to project a time-coded sequence of spatial patterns, in accordance with another embodiment of the present invention. Subassembly 80 may be used in place of the subassembly 30 in device 22 (FIG. 1), for example. Subassembly 80 comprises multiple parallel radiation sources 82, 84, 86, 88, . . . , such as infrared (IR) laser diodes, which may be mounted side-by-side on a substrate 90, such as a printed circuit board. The sources are turned on and off in succession by a control circuit 102, so that typically one source is lit at any given time during the operation of subassembly 80.

To create the desired time-coded patterns, sources 82, 84, 86, 88, . . . , transilluminate respective areas 94, 96, 98, 100, . . . , of a patterned element 92. Typically, projection optics (such as lens 35, shown in FIG. 1) project the respective patterns onto the field of view of device 22. Although only four sources and corresponding areas are shown in FIG. 6, in practice larger numbers of sources and corresponding areas can be used to create a larger number of spatial patterns. Furthermore, although element 92 is shown in the figure as a single plate, areas 94, 96, 98, 100, . . . , within element 92 may alternatively be implemented as separate components.

Sources 82, 84, 86, 88, . . . , may be arranged in a linear array, as shown in FIG. 6, or they may alternatively be arranged in a two-dimensional array, with areas 94, 96, 98, 100, . . . , configured accordingly.

Patterned element 92 is designed and fabricated so that each area 94, 96, 98, 100, . . . , creates a different spatial pattern, such as the patterns shown in FIGS. 4A, 4B and 4C. For this purpose, element 92 may comprise, for example, a suitable diffractive optical element (DOE) or micro-lens array (MLA), for projection of the pattern. The density and/or other aspects of the pattern on element 92 may vary from area to area, so that as each radiation source 82, 84, 86, 88, . . . , is turned on, it creates a different spatial pattern in the time-coded sequence.

In an alternative embodiment, a beam from a single source (as in subassembly 30) is scanned from area to area over element 92, thereby illuminating each of areas 94, 96, 98, 100, . . . , and creating the corresponding spatial patterns in turn.

Although the embodiments described above relate to a particular depth mapping configuration, the principles of the devices and methods presented above may be applied in other configurations, and for applications other than depth mapping.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for depth mapping, comprising:
    illuminating an object with a time-coded pattern;
    capturing images of the time-coded pattern on the object using a matrix of detector elements;
    storing reference values corresponding to a reference image of the time-coded pattern at a predefined reference frame;

decoding the time-coded pattern in the captured images using processing circuitry embedded in each of the detector elements by generating respective output words from the detector elements based on the captured images, and taking differences by subtraction between the respective output words and the stored reference values so as to generate respective digital shift values; and converting the shift values into depth coordinates.

2. The method according to claim 1, wherein illuminating the object comprises projecting a temporal sequence of spatial patterns of light onto the object.

3. The method according to claim 2, wherein the spatial patterns comprise alternating bright and dark stripes, having a different, respective spatial frequency in each of the spatial patterns.

4. The method according to claim 2, wherein the spatial patterns comprise one or more gray-scale patterns.

5. The method according to claim 2, wherein capturing the images comprises capturing multiple successive image frames, and wherein the temporal sequence extends over a given number of the successive image frames, and wherein decoding the time-coded pattern comprises combining signals from the given number of the successive image frames.

6. The method according to claim 2, wherein projecting the temporal sequence comprises:
scanning an illumination beam along a first axis, while modulating the beam; and
applying a cylindrical optical element to generate the spatial patterns by spreading the modulated beam along a second axis, perpendicular to the first axis.

7. The method according to claim 2, wherein projecting the temporal sequence comprises:
providing a patterned element comprising multiple areas, which when illuminated, created respective ones of the spatial patterns; and
illuminating the areas sequentially so as to project the temporal sequence of the spatial patterns.

8. The method according to claim 1, wherein capturing the images comprises generating electrical charge in each of the detector elements responsively to the time-coded pattern, and
wherein decoding the pattern comprises switching the charge among different charge storage components in each of the detector elements in synchronization with the timecoded pattern.

9. The method according to claim 8, wherein the temporal sequence and switching the charge are synchronized by a global clock, and wherein decoding the pattern comprises reading data out of the matrix of the detector elements under control of a local clock, which is unsynchronized with the global clock.

10. The method according to claim 9, wherein the matrix comprises multiple rows of the detector elements, and wherein reading the data out comprises outputting the data from the detector elements row by row using a rolling shutter controlled by the local clock.

11. The method according to claim 8, wherein decoding the pattern comprises:
making a comparison of the charge stored in each of the charge storage components to a threshold level;
generating bit values responsively to the comparison; and
concatenating the bit values to generate the respective digital shift values.

12. The method according to claim 8, wherein decoding the pattern comprises combining signals from the charge storage components in groups of neighboring detector elements so as to provide the depth coordinates with enhanced depth resolution.

13. The method according to claim 1, wherein illuminating the object comprises projecting a temporal sequence of spatial patterns of light onto the object, and
wherein capturing the images comprises capturing multiple successive image frames, and the temporal sequence extends over a given number of the successive image frames, and
wherein decoding the pattern comprises combining signals from the given number of the successive image frames while combining the signals from groups of neighboring detector elements.

14. The method according to claim 1, wherein converting the shift values comprises generating a depth map of the object by triangulation of the digital shift values.

15. Apparatus for depth mapping, comprising:
an illumination subassembly, which is configured to illuminate an object with a time-coded pattern;
an image capture subassembly, which comprises:
a matrix of detector elements configured to capture images of the time-coded pattern on the object;
registers configured to store reference values corresponding to a reference image of the time-coded pattern at a predefined reference frame;
processing circuitry, which is embedded in each of the detector elements and is configured to decode the time-coded pattern in the captured images so as to provide respective output words from the detector elements based on the captured images; and
a subtracter, which is coupled to take differences between the respective output words and the stored reference values so as to output respective digital shift values; and
a processor, which is configured to convert the shift values into depth coordinates.

16. The apparatus according to claim 15, wherein the illumination subassembly is configured to illuminate the object by projecting a temporal sequence of spatial patterns of light onto the object.

17. The apparatus according to claim 16, wherein the spatial patterns comprise alternating bright and dark stripes, having a different, respective spatial frequency in each of the spatial patterns.

18. The apparatus according to claim 16, wherein the spatial patterns comprise one or more grayscale patterns.

19. The apparatus according to claim 16, wherein the image capture assembly is configured to capture multiple successive image frames, and wherein the temporal sequence extends over a given number of the successive image frames, and wherein the processing circuitry is configured to combine the signals from the given number of the successive image frames to generate the shift values.

20. The apparatus according to claim 16, wherein the illumination subassembly comprises:
a radiation source, which is configured to generate an illumination beam;
scanning optics, which are configured to scan the illumination beam along a first axis while the illumination beam is modulated; and
a cylindrical optical element, which is configured to generate the spatial patterns by spreading the modulated beam along a second axis, perpendicular to the first axis.

21. The apparatus according to claim 16, wherein the illumination subassembly comprises:

a patterned element comprising multiple areas, which when illuminated, create respective ones of the spatial patterns; and at least one radiation source, which is configured to illuminate the areas sequentially so as to project the temporal sequence of the spatial patterns.

22. The method according to claim 15, wherein the detector elements are configured to generate electrical charge responsively to the time-coded pattern, and wherein the processing circuitry comprises, in each of the detector elements:

multiple charge storage components; and a switch which is configured to switch the charge from the detector elements among the charge storage components in synchronization with the time-coded pattern.

23. The apparatus according to claim 22, wherein the temporal sequence and switching the charge are synchronized by a global clock, and wherein the image capture subassembly is configured to read data out of the matrix of the detector elements under control of a local clock, which is unsynchronized with the global clock.

24. The apparatus according to claim 23, wherein the matrix comprises multiple rows of the detector elements, and wherein the data from the detector elements are read out row by row using a rolling shutter controlled by the local clock.

25. The apparatus according to claim 22, wherein the processing circuitry comprises comparator logic, which is configured to make a comparison of the charge stored in each of the charge storage components to a threshold level, to generate bit values responsively to the comparison, and to concatenate the bit values to generate the respective digital shift values.

26. The apparatus according to claim 22, wherein the processing circuitry is configured to combine the signals from the charge storage components in groups of neighboring detector elements so as to provide the depth coordinates with enhanced depth resolution.

27. The method according to claim 15, wherein the illumination subassembly is configured to illuminate the object by projecting a temporal sequence of spatial patterns of light onto the object, and wherein the image capture assembly is configured to capture multiple successive image frames, and the temporal sequence extends over a given number of the successive image frames, and wherein the processor is configured to combine the signals from the given number of the successive image frames while combining the signals from groups of neighboring detector elements.

28. The method according to claim 15, wherein the processor is configured to convert the shift values comprises generating a depth map of the object by triangulation of the digital shift values.

* * * * *